United States Patent
Syrivelis et al.

(10) Patent No.: US 11,863,469 B2
(45) Date of Patent: Jan. 2, 2024

(54) UTILIZING COHERENTLY ATTACHED INTERFACES IN A NETWORK STACK FRAMEWORK

(71) Applicant: INTERNATIONAL BUSINESS MACHINES CORPORATION, Armonk, NY (US)

(72) Inventors: Dimitrios Syrivelis, Dublin (IE); Andrea Reale, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 15/929,518

(22) Filed: May 6, 2020

(65) Prior Publication Data
US 2021/0352023 A1    Nov. 11, 2021

(51) Int. Cl.
| | |
|---|---|
| *H04L 49/9005* | (2022.01) |
| *H04L 49/9047* | (2022.01) |
| *G06F 13/20* | (2006.01) |
| *G06F 9/54* | (2006.01) |
| *G06F 13/16* | (2006.01) |
| *G06F 13/36* | (2006.01) |

(52) U.S. Cl.
CPC .......... *H04L 49/9005* (2013.01); *G06F 9/547* (2013.01); *G06F 13/1652* (2013.01); *G06F 13/20* (2013.01); *G06F 13/36* (2013.01); *H04L 49/9047* (2013.01)

(58) Field of Classification Search
CPC ............. H04L 49/9005; H04L 49/9047; H04L 49/9063; G06F 9/547; G06F 13/1652; G06F 13/20; G06F 13/36; G06F 13/1673
See application file for complete search history.

(56) References Cited

U.S. PATENT DOCUMENTS

| | | |
|---|---|---|
| 8,909,872 B1 | 12/2014 | Schlansker et al. |
| 9,143,467 B2 | 9/2015 | Kagan et al. |
| 9,390,013 B2 | 7/2016 | Blaner et al. |
| 9,535,863 B2* | 1/2017 | Falco ............ G06F 13/20 |
| 10,338,847 B1 | 7/2019 | Mastropaolo |
| 10,397,140 B2 | 8/2019 | Banerjee et al. |
| 10,439,942 B2 | 10/2019 | Lee et al. |
| 2004/0268017 A1* | 12/2004 | Uzrad-Nali ...... H04L 69/166 |
| | | 711/1 |

(Continued)

FOREIGN PATENT DOCUMENTS

| | | |
|---|---|---|
| CN | 102006241 A | 4/2011 |
| CN | 109558226 A | 4/2019 |

(Continued)

OTHER PUBLICATIONS

Emmerich et al., "User Space Network Drivers"; arXiv: 1901.10664v2 [cs.NI] Sep. 8, 2019; (14 Pages).

(Continued)

*Primary Examiner* — Thai Nguyen
(74) *Attorney, Agent, or Firm* — L. Jeffrey Kelly

(57) ABSTRACT

Embodiments for implementing an enhanced network stack framework in a computing environment. A plurality of network buffers coherently attached between one or more applications and a network interface may be shared while bypassing one or more drivers and an operating systems using an application buffer, a circular buffer and a queuing and pooling operation.

17 Claims, 10 Drawing Sheets

(56) References Cited

U.S. PATENT DOCUMENTS

| | | | |
|---|---|---|---|
| 2008/0065832 A1* | 3/2008 | Srivastava | G06F 12/0862 |
| | | | 711/130 |
| 2009/0089475 A1 | 4/2009 | Chitlur et al. | |
| 2014/0036680 A1* | 2/2014 | Lih | H04L 47/6215 |
| | | | 370/235 |
| 2014/0245303 A1* | 8/2014 | Magro | G06F 15/17331 |
| | | | 718/1 |
| 2014/0317336 A1* | 10/2014 | Fitch | G06F 12/1036 |
| | | | 711/103 |
| 2015/0331722 A1 | 11/2015 | Magro | |
| 2016/0188780 A1 | 6/2016 | Greenwood et al. | |
| 2017/0139839 A1 | 5/2017 | Bandic et al. | |
| 2017/0139849 A1 | 5/2017 | Bandic et al. | |
| 2017/0346899 A1* | 11/2017 | Joshi | G06F 3/067 |
| 2018/0225204 A1 | 8/2018 | Choudhari et al. | |
| 2018/0285074 A1 | 10/2018 | Shergill et al. | |
| 2019/0050335 A1 | 2/2019 | Natu et al. | |
| 2019/0310937 A1 | 10/2019 | Bachmutsky | |
| 2020/0004993 A1 | 1/2020 | Volos | |
| 2021/0089477 A1* | 3/2021 | Kachare | G06F 9/544 |

FOREIGN PATENT DOCUMENTS

| | | | | |
|---|---|---|---|---|
| CN | 111104459 | A | 5/2020 | |
| CN | 115485671 | A | 12/2022 | |
| DE | 112021001408 | T5 | 3/2023 | |
| GB | 2544515 | A | 1/2016 | |
| GB | 2610750 | A | 3/2023 | |
| WO | WO-2015199971 | A1 * | 12/2015 | G06F 9/5044 |
| WO | 2018080734 | A1 | 5/2018 | |
| WO | 2021224739 | A1 | 11/2021 | |

OTHER PUBLICATIONS

Xi et al.; "Prioritizing Local Inter-Domain Communication in Xen"; 2013 (10 Pages).

Zang et al.; "A Highly Efficient Inter-Domain Communication Channel"; IEEE Ninth International Conference on Computer and Information Technology; 2009 IEEE (6 Pages).

Schlansker et al.; "High-Performance Ethernet-Based Communications For Future Multi-Core Processors"; SC07 Nov. 10-16, 2007, Reno, Nevada, USA (12 Pages).

Notification of Transmittal of the International Search Report and the Written Opinion of the International Searching Authority, or the Declaration, dated Aug. 12, 2021, Applicant's or agent's file reference P201907766, International application No. PCT/IB2021/053622, 8 pages.

* cited by examiner

UTILIZING COHERENTLY ATTACHED INTERFACES IN A NETWORK STACK FRAMEWORK

BACKGROUND OF THE INVENTION

Field of the Invention

The present invention relates in general to computing systems, and more particularly to, various embodiments for utilizing coherently attached interfaces in a network stack framework in a computing environment.

Description of the Related Art

In today's society, consumers, business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computing systems.

SUMMARY OF THE INVENTION

Various embodiments for utilizing coherently attached interfaces in a network stack framework in a computing environment are provided. A plurality of network buffers coherently attached between one or more applications and a network interface may be shared while bypassing one or more drivers and an operating systems using an application buffer, a circular buffer and a queuing and pooling operation.

BRIEF DESCRIPTION OF THE DRAWINGS

For the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
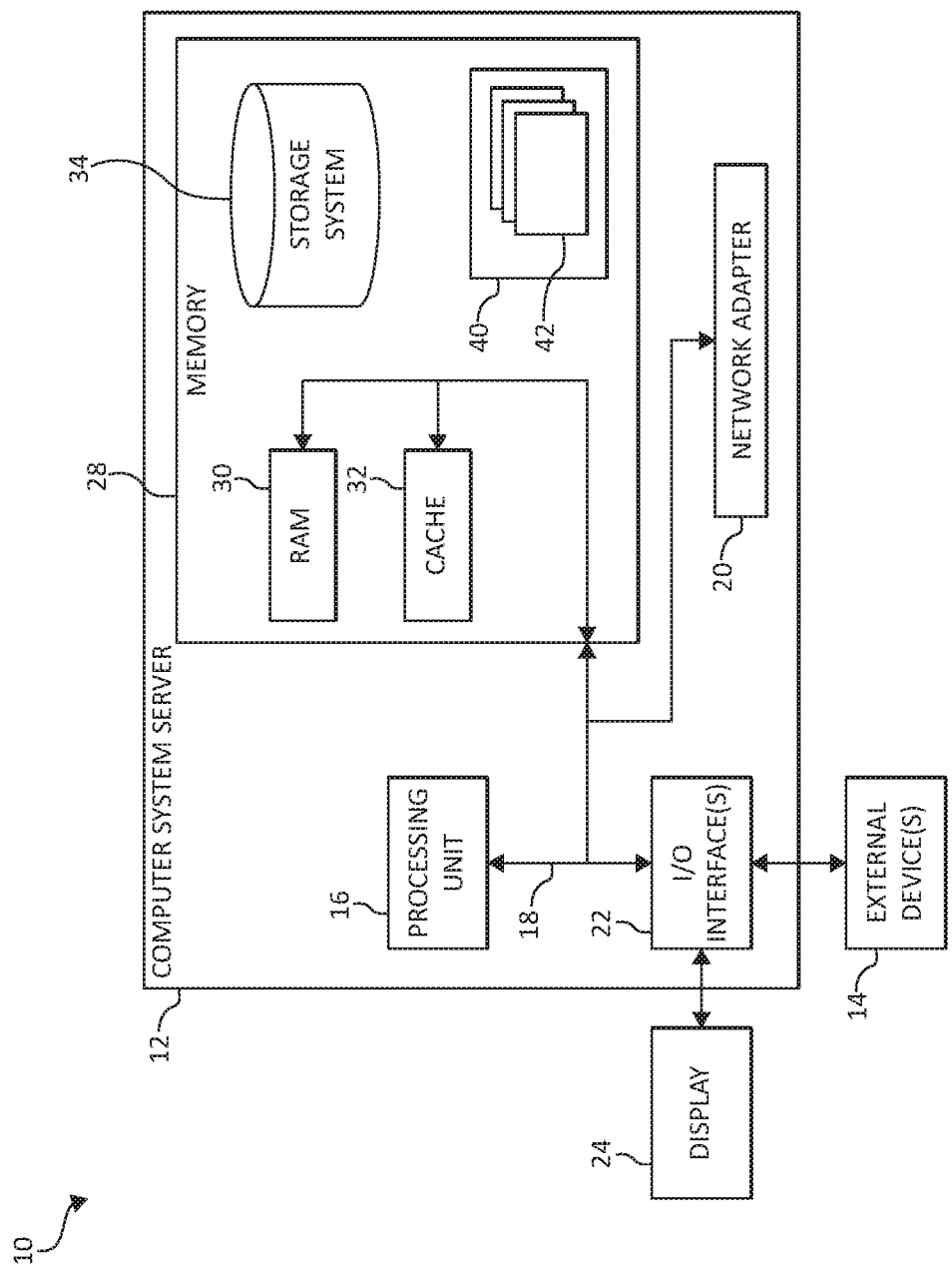
FIG. 1 is a block diagram depicting an exemplary cloud computing node according to an embodiment of the present invention.

As a preliminary matter, cache coherence, also referred to as memory coherence, is an issue that affects the design of computer systems in which two or more processors or cores share a common area of memory. In a single processor system, there is only one processing element doing all the work and, therefore, only one processing element that can read to or write from a given memory location. As a result, when a value is changed, all subsequent read operations of the corresponding memory location will see the updated value, even if it is cached.

Conversely, in multiprocessor (or multicore systems), there are two or more processing elements working at the same time, and so it is possible that they simultaneously access the same memory location. Provided none of the processors changes the data in this location, the processor can share the data indefinitely and cache the data as it pleases. But, as soon as a processor updates the location, the other processors might work on an out-of-date copy that may reside in its local cache. Consequently, some scheme is required to notify all the processing elements of changes to shared values; such a scheme is known as a "cache coherence protocol," and if such a protocol is employed the system is said to have "cache coherence." The exact nature and meaning of the cache coherency is determined by the consistency model that the coherence protocol implements.

A cache coherency protocol typically defines a set of cache states stored in association with cached copies of memory blocks, as well as the events triggering transitions between the cache states and the cache states to which transitions are made. Thus, in order to maintain coherency of data across the system, the cache coherency protocol is used such as, for example, a directory-based protocol, a snoop-based protocol, a combinations thereof, or other variations so as to ensure at least a minimum required level of coherence among the various processor core's "views" of the contents of system memory.

In addition, modern day computing systems, with various system buses, system intraconnects and interconnects between various application and local or adjacent systems, have various protocols for transferring data and sharing memory between various components. For example, computing systems aim to provide increased performance using cache coherence to enable coherent interconnections between general-purpose processors and acceleration devices for heterogeneous computing, which attempt to avoid the bandwidth limitations or latency that is inherent in some connection such as, for example, a on a PCI Express (PCIe) bus (where the PCIe is a multilane, point-to-point interconnect that can scale from one lane to many). That is, computing systems attempt to provide increased computing efficiency while maintaining cache coherency when providing data access across memory spaces of various types of processors. For example, the open coherent accelerator processor interface ("CAPI") which is an interface between processor and accelerators to increase bandwidth and provide lower latency. As another example, cache coherent interconnect for accelerators ("CCIX") may be used, which is built on a PCI Express (PCIe) to provide a chip-to-chip interconnect for high-speed hardware accelerators and targets certain applications.

However, even within these modern computing systems, transferring, communicating, and/or receiving data between various application and local or adjacent systems still experience network latency along the network path. For example, in the context of tightly integrated high performance computer ("HPC") systems with few switching layers, delivering data to the target application includes a network path delay (once inside a destination device) that may be several nanoseconds ("nsecs") higher than transferring the data among servers (e.g., at least within a scale of a few co-located racks, especially if a network stack needs to be traversed). Thus, a need exits to provide a cache-coherent interconnect system to maintain cache coherency, increase bandwidth, and reduce/eliminate the network access latency path in HPC/heterogenous computing systems, where the network access latency may starts from the time a data signals arrive at a network interface and ends with a shared memory having the data (e.g., ends with an actual data copy of the data to the destination memory/memory cells) to enable receiving applications to uses the data.

Thus, various embodiments, as described herein, provide an enhanced network architecture that leverages the cache-coherent attachment of processors that enable direct mastering of local system bus architecture-agnostic loads and stores operations to system memory by off-chip peripherals. This way, memory transactions get decoupled from specific bus architecture and the same unmodified coherently-attached logic (of accelerators, network interfaces, etc.) can be interfaced to different SoC architectures. In one aspect, the various embodiments improve a network access latency path and provides for sharing memory between one or more applications and one or more network interfaces while bypassing one or more drivers and the operating system.

The mechanisms of the illustrated embodiments of the enhanced network architecture enable off-chip accelerators to obtain be integrated with a system on a chip ("SoC") and directly master and cache-coherently load and store to system memory using the same memory access data path (e.g., a hardware data path similar to on-chip entities (e.g., processors, coprocessors) having with comparable latency and bandwidth.

In an additional aspect, the present invention provides for direct access to the in-memory data, the generation of interrupts, and ability to atomically compete for spinlocks with CPUs are also provided by coherently attached ports. This means that if application and coherently-attached device agree on a data format, there is no requirement for any operating system device driver support and DMA programmable hardware to be used for scatter-gather data transfers. By enabling and providing driver-less integration, the programming model and application programming interface ("API"), which appears as a thread mutual exclusion, i.e., the network I/O is integrated as a special form of a hardware thread, is further simplified providing increased computing efficiency.

Accordingly, the present invention provides for a network framework stack sharing memory buffers (e.g., "network buffers") between the various applications and the network interface(s). In one aspect, the memory buffers may be used interchangeably with network buffers. The network buffers may be allocated on behalf of one or more applications by an operating system ("OS") and are offered under the control of a library (e.g., a shared library). In one aspect, a shared address space, between all participating applications that is established over shared memory mechanism, may be provided and used for input/output ("I/O") control (i.e., exchange of pointers and spinlock handling). Then, each application may have a memory management unit ("MMU") protected shared access with the accelerator on a common address space which contains the application network buffers.

In this way, the present invention enables applications to seamlessly exchange in-memory data over a network by only handling pointers and spinlocks to further simplify a remote direct memory access ("RDMA")-style network communication by using coherently attached port technology to achieve unprecedented latency (e.g., current RDMA round trip latency is 1.2 microseconds "usec" with one switching layer, whereas Coherently attached interfaces may reduce this latency down to 600-700 nanoseconds "nsec") for data delivery within a "black box" and enable the network media to leverage ultra-high bursts (i.e., a single hardware-level burst for the whole application-level message size is now possible). The illustrated embodiments of the network stack framework system is a framework that is agnostic to any network Medium Access Protocols ("MAC") or Link Layer Control protocols ("LLC"), and thus, can be potentially integrated with any packet or circuit network technology.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
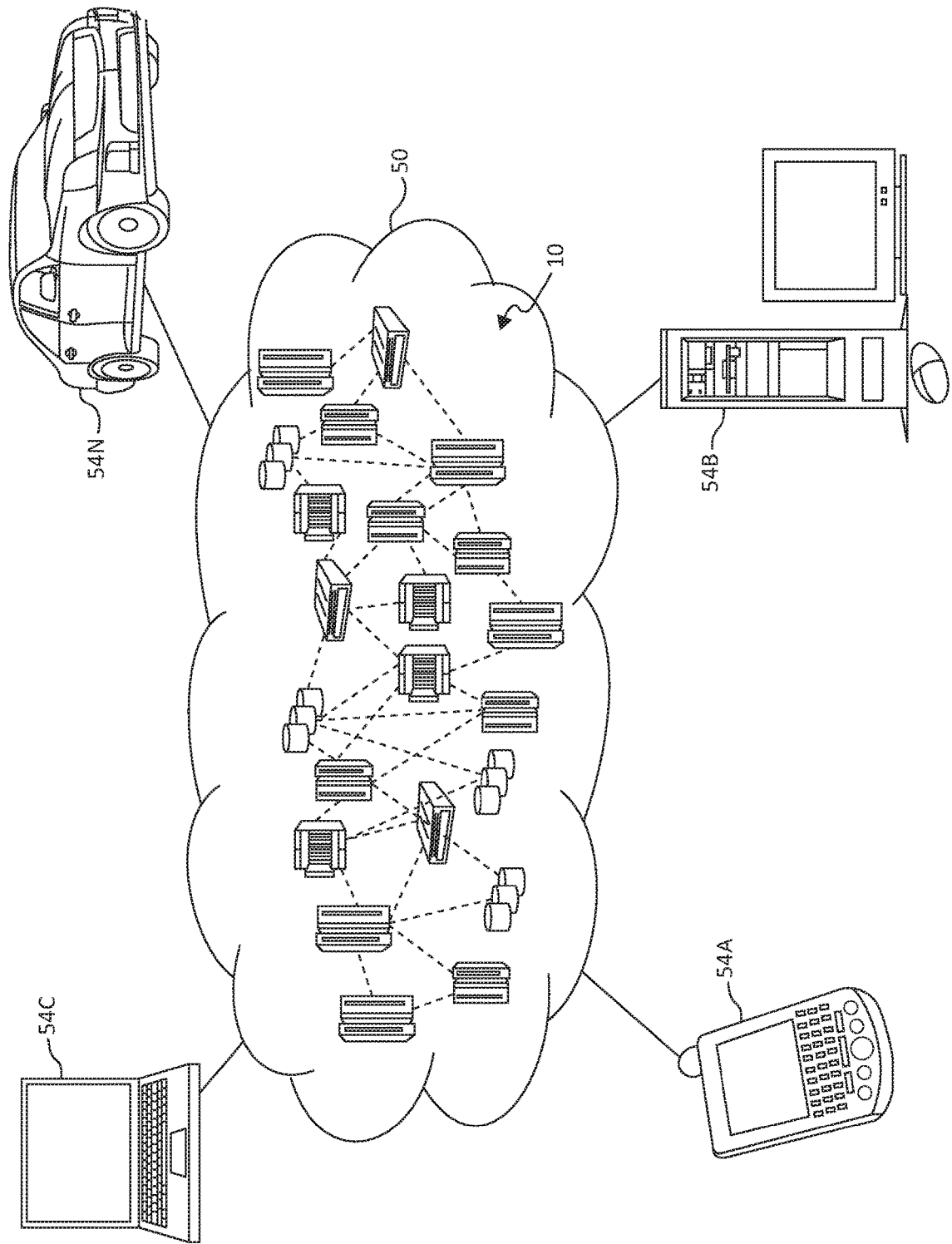
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
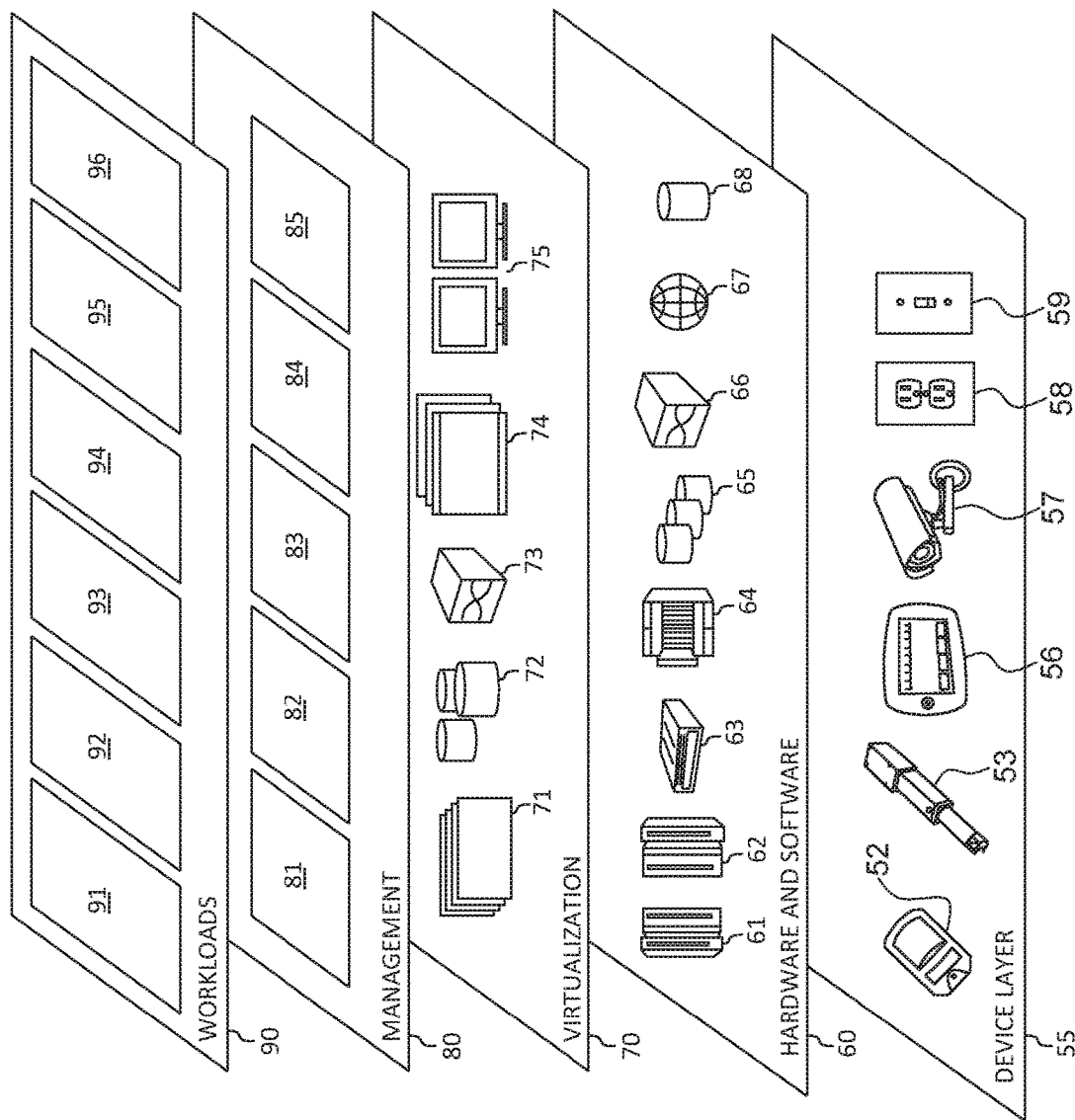
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for utilizing coherently attached interfaces in a network stack framework. In addition, workloads and functions 96 for utilizing coherently attached interfaces in a network stack framework may include such operations as data analysis. One of ordinary skill in the art will appreciate that the workloads and functions 96 for utilizing coherently attached interfaces in a network stack framework may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
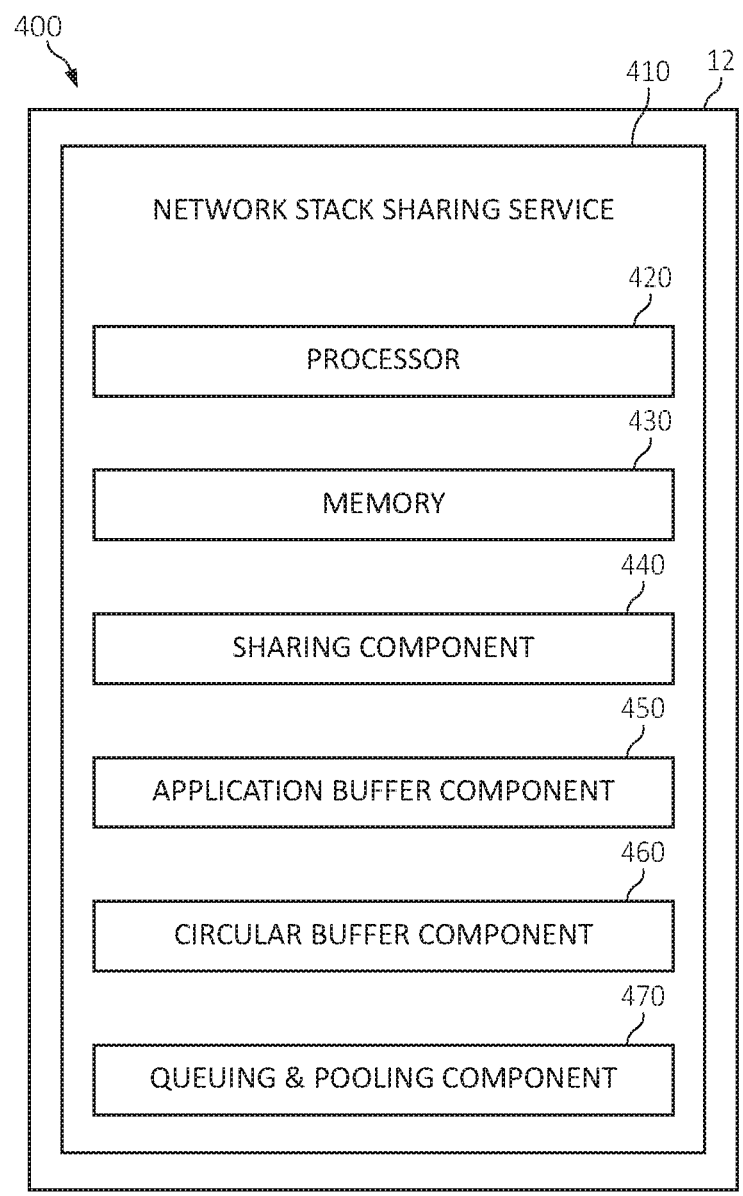
FIG. 4 is a block diagram depicting an operation mode for utilizing coherently attached interfaces in a network stack framework in a computing environment in which various aspects of the present invention may be realized.

Turning now to FIG. 4 a block diagram depicting exemplary functional components 400 according to various mechanisms of the illustrated embodiments is shown. FIG. 4 illustrates system 400 for utilizing coherently attached interfaces in a network stack framework. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for intelligent causal knowledge extraction in accordance with the present invention. Many of the functional blocks 400 may execute as background processes on various components, either in distributed computing components, or on the user device, or elsewhere.

As illustrated in FIG. 4, network stack sharing service 410 is shown, incorporating processing unit 420 ("processors) and memory 430, which may also be the processing unit 16 ("processor") and memory 28 of FIG. 1, to perform various computational, data processing and other functionality in accordance with various aspects of the present invention. The processing unit 420 may be in communication with memory 430. The network stack sharing service 410 may be provided by the computer system/server 12 of FIG. 1.

As one of ordinary skill in the art will appreciate, the depiction of the various functional units in the network stack sharing service 410 is for purposes of illustration, as the functional units may be located within the network stack sharing service 410 or elsewhere within and/or between distributed computing components.

The network stack sharing service 410 may include a sharing component 440, an application buffer component 450, a circular buffer component 460, and a queuing and pooling component 470. Thus, the network stack sharing service 410 enables coherent attachment of network interfaces to system memory entirely bypassing drivers and an OS.

In one embodiment, by way of example only, the sharing component 440 (and/or in association with the application buffer component, circular buffer component 460, the queueing and pooling component 470, or a combination thereof) may share a plurality of network buffers coherently attached between one or more applications and a network interface while bypassing one or more drivers and an operating systems using an application buffer, a circular buffer and a queuing and pooling operation.

The sharing component 440 may include and/or be associated with a shared library (see also a shared library 504 of FIG. 5A-5B) control the plurality of network buffers by a shared library.

The sharing component 440 may share one or more address spaces of the plurality of network buffers between the one or more applications using the network interface, wherein the plurality of network buffers used for input/output (I/O) control.

The application buffer component 450 may safely share one or more application virtual address spaces of multiple network buffers with the coherently attached network interface (see coherently attached network interface 512 of FIG. 5). The circular buffer component 460 may exchange memory pointers with one or more coherently attached devices.

The queuing and pooling component 470 may execute the queuing and pooling operation for the plurality of network buffers for network buffer transmission, reception, and manipulation. The queuing and pooling component 470 may move, assign, or reassign one of the plurality of network buffers from one or more queues and one or more pools for executing the queuing and pooling operation. That is, the queuing and pooling component 470 may provide for network buffer transmission, reception, manipulation and share buffers that belong to different application virtual address spaces with a network interface in a coherent domain.

The sharing component 440 may establish a shared memory region and a private memory region using the plurality of network buffers.

Figure 5A:
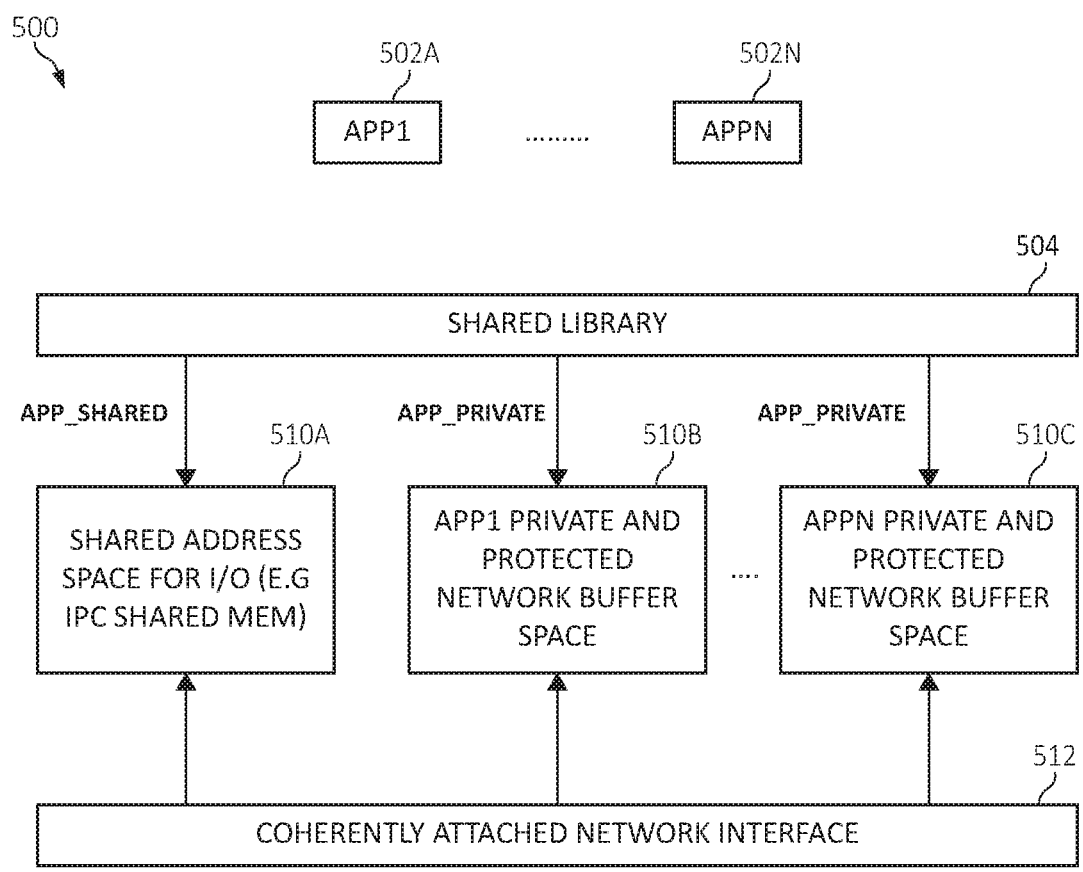
FIGS. 5A-5B are diagrams depicting utilizing coherently attached interfaces in a network stack framework in a computing environment in accordance with aspects of the present invention.
Figure 5B:
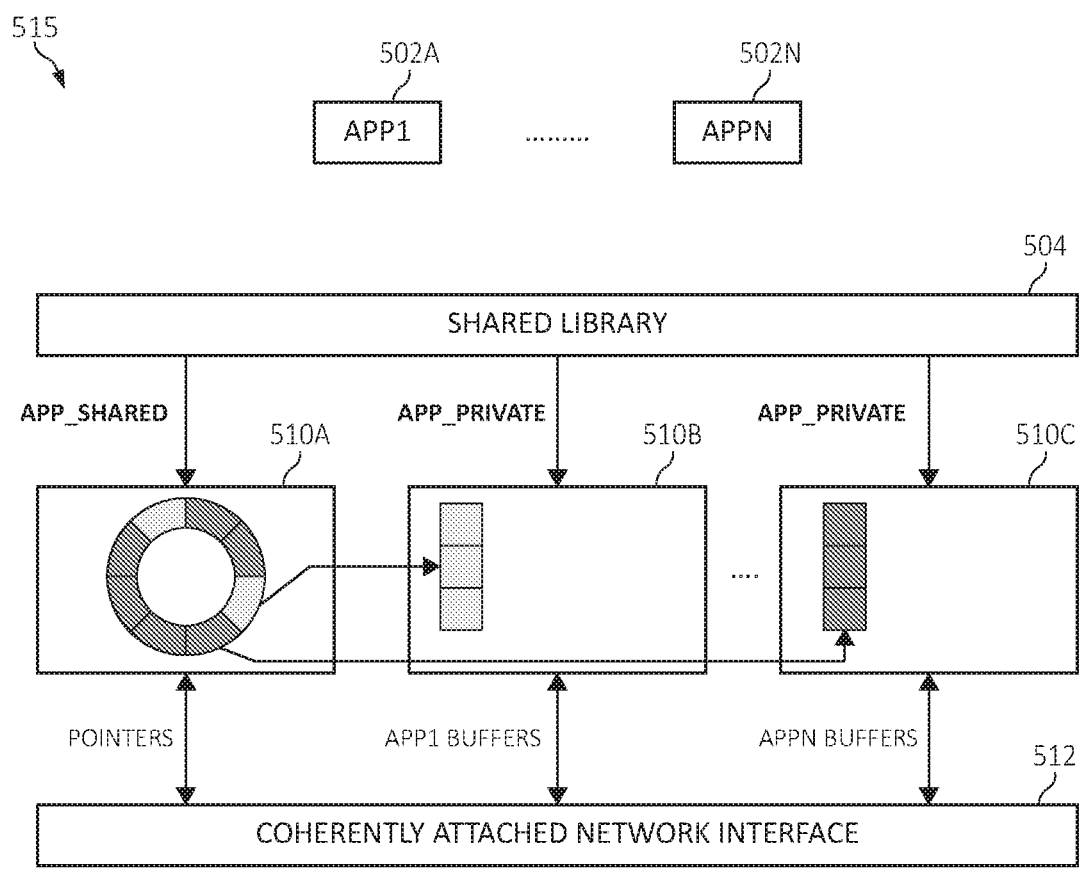

Turning now to FIGS. 5A-5B, diagram depicting a schematic of a network stack framework 500 and 515 for utilizing coherently attached interfaces. As will be seen, many of the functional blocks may also be considered "modules" or "components" of functionality, in the same descriptive sense as has been previously described in FIGS. 1-4. Also, one or more of the operations and steps of FIGS. 1-4 may also be included in one or more operations or actions of FIGS. 5A-5B. Repetitive description of like elements, components, modules, services, applications, and/or or functions employed in other embodiments described herein is omitted for sake of brevity.

As depicted, the network stack framework 500 includes and/or is associated with one or more applications (e.g., App 1 or "Application 502A" and App N or "Application N"). Also, the one or more applications 502A-502N may be in communication with a shared library 504. The network stack framework 500 may also include one or more network buffers such as, for example, network buffers 510A-510C. In one aspect, the network buffers 510A-510C may be shared and/or restricted as "private." For example, network buffer 510A may be a shared network buffer while network buffers 510B and 510C may be private network buffers. The network buffers 510A-510C may be in communication/association with a coherently attached network interface 512. Thus, the network buffers 510A-510C may be coherently attached between one or more applications (e.g., the applications 502A-502N) and a network interface (e.g., the coherently attached network interface 512) while bypassing one or more drivers and an operating systems using an application buffer, a circular buffer (see also FIGS. 6A-6B) and a queuing and pooling operation (see also FIG. 6A-6B).

In one aspect, by way of example only, the arrangement of the address spaces for the network buffers 510A-510C is depicted for N example applications such as, for example, applications 502A-502N. The shared library 504 may establish a common region over shared memory (e.g., "APP_SHARED" for sharing access for application in network buffers 510A) and a private region (e.g., "APP_PRIVATE" for providing private access for an application in network buffers 510B-510C). Also, as described herein, the various constructs that comprise the network buffer stack will also refer to the address space used and coherently attached network interface(s) 512 may be associated with distinct application address spaces concurrently by leveraging hardware level support such as, for example, PCI PASID ("peripheral component interface ("PCI") process address space identifier ("PASID") and the like.

In one aspect, as part of connection establishment with one or more remote counterparts, an application (e.g., applications 502A-502N which may be a user application) may reserve a number of associated network buffers for communication, which reside at a private region (e.g., "APP_PRIVATE" for providing private access for an application in network buffers 510B-510C). In the context of each application, a network buffer (e.g., one of the network buffers 510A-510C) may belong at any given point in time to only one of the following 6 constructs, which may be separately maintained by the shared library 504 for each application. Also, each of the queues and pools, as described herein, may use the circular buffers 620A-620N of FIGS. 6A-6B for execution and performing the various functions of each of the described queues and pools.

In a first construct or "first pool," a "global software ("s/w") free pool (e.g., default state) may be a common pool for all connections across all applications and all network buffers belong here during initialization until action is taken. The pointers to all these network buffers are maintained by the shared library 504 at the "APP_SHARED" region in the network buffer 510A, classified per active application and contains only the network buffer pointers.

In a second construct or "second pool," a global hardware ("H/w") free pool may proactively be a number of free network buffers that are pushed to this global hardware free pool and the free network buffers may be moved from global software ("s/w") free pool. Each application may have contributed buffers to this pool (e.g., the global software ("s/w") free pool) and should always replenish the global software ("s/w") free pool as network buffers are consumed for data reception. If the global software ("s/w") free pool becomes empty for a given application, the global software ("s/w") free pool will stop accepting network buffers from remote nodes destined to that application. The pointers for this global software ("s/w") free pool reside in the "APP_SHARED" region in the network buffer 510A and contains only the network buffer pointers.

In a third construct or "third pool," a processing pool(s) may include network buffers that are being actively modified by local processors, graphics processing units ("GPUs"), accelerators etc., which is "per application pool" and is maintained for garbage collection purposes. In case the network buffers are not returned, the network buffers are garbage collected by the shared library 504 upon owner application exit. The processing pool(s) may reside at the "APP_SHARED" region in the network buffer 510A and contains only the network buffer pointers.

In a third construct or "third queue," a receive queue(s) may include network buffers that are updated with contents sent from the remote host with which the communication is established where one receive queue is created at the "APP_SHARED" region in the network buffer 510A per remote connection (e.g., hosts only the buffer pointers). The receive queue(s) may be a first-in-first-out ("FIFO") queue.

In a fourth construct or "fourth queue," a global send queue may include network buffers that are marked for sending and the global send queue is shared among all connections across all applications so that hardware access all network buffers and perform a transmission (e.g., the global send queue hosts only the network buffer pointers). The global send queue is a FIFO queue that contains pointers and is at the "APP_SHARED" region in the network buffer 510A.

In a fifth construct or "fifth queue," a sent queue(s) may include network buffers for which sending is complete can be returned back to the owner application via this queue. The sent queue(s) may be a FIFO queue with pointers residing at the "APP_SHARED" region in the network buffer 510A (which are protected network buffer space).

In an additional aspect, as depicted in FIG. 5B, all queues and pools may be maintained, for example, at the "APP_SHARED" region in the network buffer 510A and may contain virtual address pointers that point to various application buffers (e.g., APP 1 buffers and APPN buffers) that reside in each application address space (of "APP_PRIVATE" region in the network buffers 510B-510C).

The application buffers (e.g., APP 1 buffers and APPN buffers) may be transferred/moved between the various pools and queues (as described above) as a response to one or more application programming interface ("API") calls and/or hardware events. That is, applications may move network buffers from a global S/w Free pool to their processing Pool. Each network buffer that belongs to an application processing pool may be moved by the owner application to the global send queue. An application may reuse one or more network buffers from the sent queue of an application by transferring/moving the one or more network buffers back to the processing pool. The sent queue may have a fixed size for each application so if the sent queue ignores the application, the sent queue may start returning the buffers to global S/w free pool, in case the sent queue is full. Every network buffer in the receive queue may be removed to the processing pool upon read by the shared library 504. For every network buffer returned to the receive queue, the shared library 504 moves a network buffer from the global S/w free pool to the global H/w free pool so the hardware may continue receiving data from the remote host.

In an additional aspect, for network addressing and logical connections (i.e., established communication between a local application that runs on local host and a remote application that runs on a remote host) the shared library 504 (which may be a software library) maintains a connection stack that has all the active connections of local-to-remote-applications. Connection tuples, (i.e., tuples that hold all the required routing and identifier information to establish bidirectional communication between a local application that runs on the local host and a remote application that runs on a remote host) may be of fixed size and are accessible by unique identifiers, which also act as offsets on a dedicated stack where they get stored. Each connection tuple may feature 1) a destination connection identifier ("ID") and network identifier (that may be acquired during connection establishment and specific to the underlying network architecture/technology), 2) local identifiers to access the various queues, 3) authentication credentials for the various queues the connection tuple has access to, and/or 4) internal port information so that network buffers can be delivered to an application.

Figure 6A:
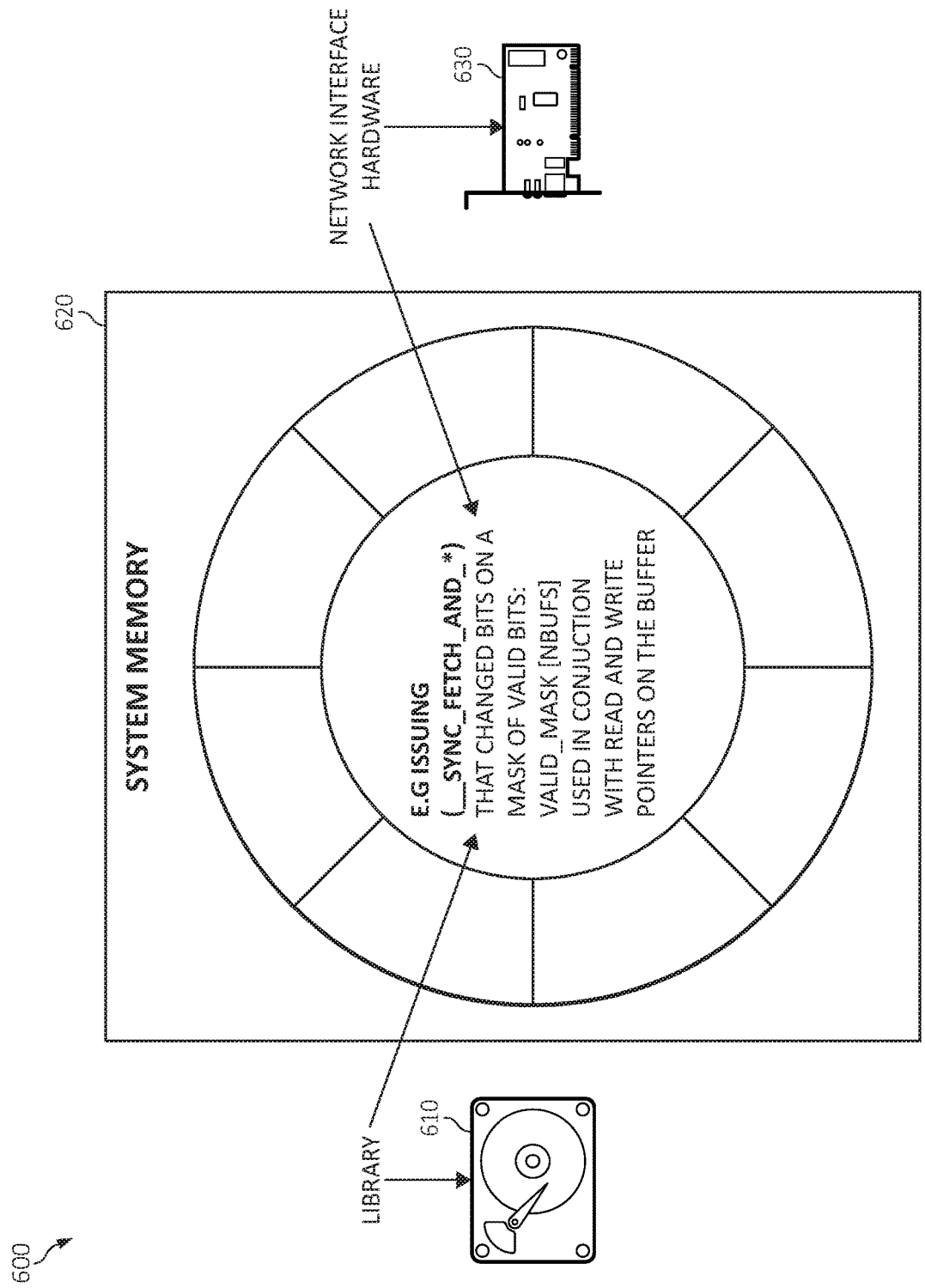
FIGS. 6A-6B are diagrams use of a circular buffer for utilizing coherently attached interfaces in a network stack framework in a computing environment in accordance with aspects of the present invention.
Figure 6B:
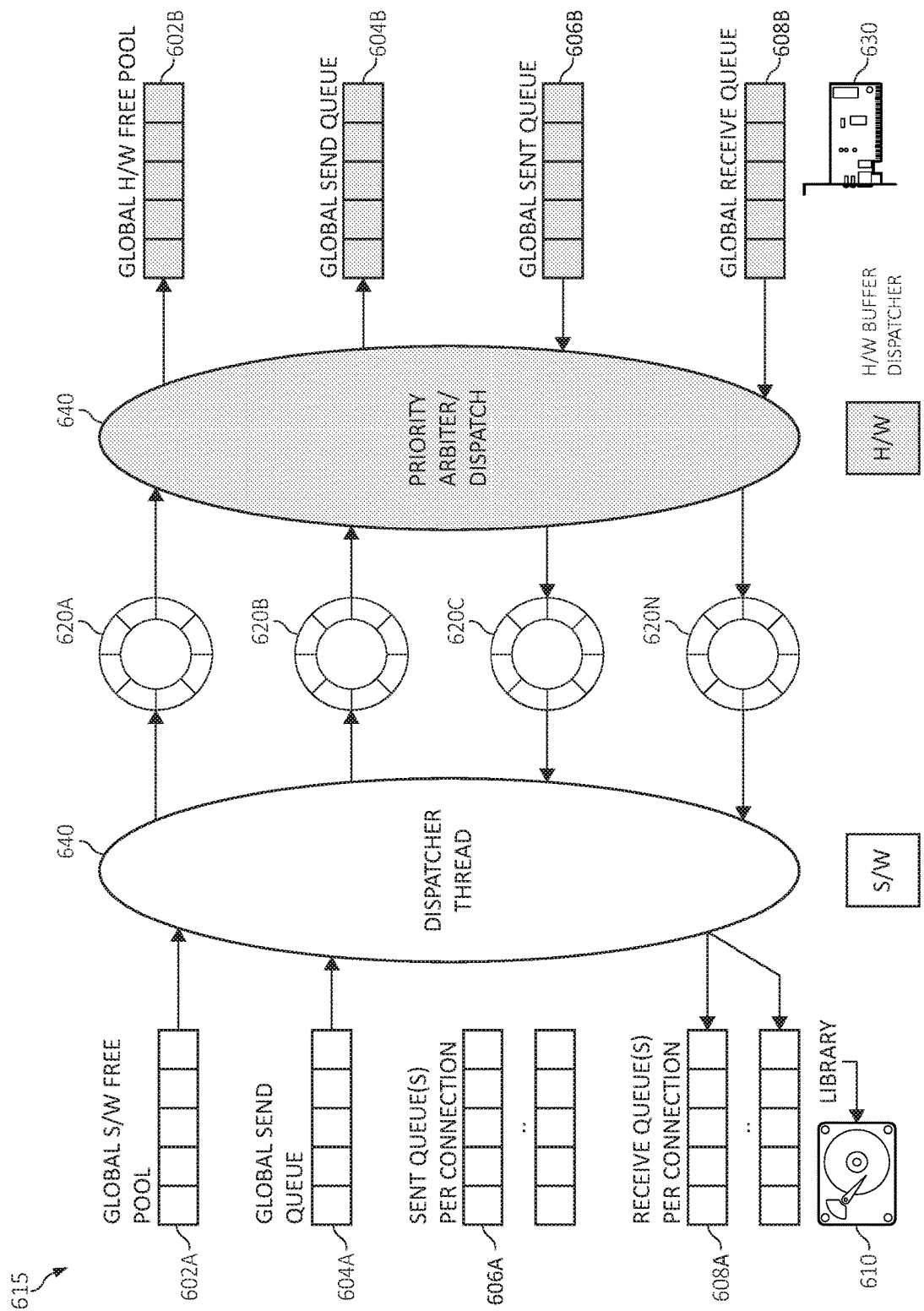

FIGS. 6A-6B are diagrams 600 and 615 use of a circular buffer for utilizing coherently attached interfaces in a network stack framework in a computing environment. As will be seen, many of the functional blocks may also be considered "modules" or "components" of functionality, in the same descriptive sense as has been previously described in FIGS. 1-5A-5B. Also, one or more of the operations and steps of FIGS. 1-5A-5B may also be included in one or more operations or actions of FIGS. 6A-6B. Repetitive description of like elements, components, modules, services, applications, and/or functions employed in other embodiments described herein is omitted for sake of brevity.

As depicted, a circular buffer 620 (e.g., circular buffer 620 of FIG. 6A and circular buffers 620-620N of FIG. 6B) is depicted that may resides at a system memory. In one aspect, given the ability of a hardware component to compete atomically for spinlocks, a hardware-software co-design may be used for circular buffer communication with the circular buffer 620.

In one aspect, the circular buffer 620 may resemble/mirror operations similar to behavior of a processor (e.g., how CPUs compete), but an all-hardware thread may be implemented by the network interface (e.g., network interface hardware 630) and may be required to "push/pull" data from system memory towards/from the network interface (e.g., network interface hardware 630). A CPU thread may also be required for delivery to applications and is spawned by a library 610. For example, a particular atomic command (e.g., atomic built-in commands of a specific processor architecture that can atomically assert and de-assert bits in a register) may be used to implement shared access to the circular buffer 620. Each circular buffer instance features a single register which represents which fields of the circular buffer have valid entries. More specifically each bit position represents that the corresponding specific circular buffer entry has valid data if the bit position value equals to logical one and it does not contain data if the bit position value equals to zero. Taking advantage of the atomic operations on the aforementioned register that indicates which entries are valid in the circular buffer 620, the coherently attached network interface can safely share the buffer with the corresponding CPU (on which the software library runs) and exchange data.

As more clearly depicted in FIG. 6B, the circular buffers 620A-620N depicts end-to-end connection between the shared library 610 (e.g., software library or "software side") and the network interface hardware 630 (e.g., hardware buffer, network buffer, network buffer dispatcher or "hardware side"). The circular buffers 620A-620N may be a single direction hardware-software shared circular buffer (e.g., the software library 610 and the network interface hardware 630 share the circular buffer) and used for interactions (e.g., used for pointer exchange).

The circular buffers 620A-620N may be single direction and different instances need to be used for different pool/queue types such as, for example, the global software ("s/w") free pool 602A, the global hardware ("H/w") free pool 602B, the processing pool(s) (i.e. pools of buffers that are currently being manipulated by application code that runs on the local host), the receive queue(s) 608A-606B (e.g., receive queues per connection), the global send queue (i.e., a single host-wide queue shared between all applications on a host that contains all the buffers that need to be transmitted by the coherently attached network interface but have not been transmitted yet) 604A and 604B, and/or the global sent queue(s) 606A-606B (i.e. one sent queue per connection, contains the buffers that have been sent to the remote host by the coherently attached network interface and therefore the application can reuse them).

In one aspect, on the software side, a dispatcher thread 640 may be used and on the hardware side a priority/arbiter dispatch 640 (e.g., a hardware buffer dispatcher), which may be used by the circular buffers 620A-620N for pushing and/or pulling data between system memory towards/from the network interface. Thus, each of the circular buffers 620A-620N may be used for both software function and hardware functions.

Thus, by way of example only, each of the circular buffers 620A-620N may pull for spinlocks from the hardware side (e.g., the network interface hardware 630) and hardware threads may mutually exclude itself from software threads to obtain the data.

In one aspect, the circular buffers 620A-620N may be only used for immediate transfer, so both the software (e.g., application) and as well as the hardware (network/memory) side may have first-in-first-out "FIFO" operations to support asynchronous operations. Thus, the circular buffers 620A-620N may retrieve pointers to an address space and use the various queues and pools to remove, move, and/or transfer network buffers from within applications and the network.

In operation, by way of example, each application has a state and the state may be the state of the queues and pools indicating where the network buffers are in the queues and pools (e.g., the global software ("s/w") free pool 602A, the global hardware ("H/w") free pool 602B, the processing pool(s) (these are virtual pools as their refer to buffers that do not belong to any other pool and therefore are being manipulated by applications), the receive queue(s) 608A-606B, the global send queue 604A and 604B, and/or the global sent queue(s) 606A-606). Using the dispatcher thread 640, each state of the queues and pools is mirrored by only exchanging pointers from the software side (S/W) to the hardware side (H/W). Mirroring the state of the queues and pools enables awareness for any changes and any updates. The hardware side now has the same view as the software library 610 and perform actions that may be offloaded to the hardware. In this way, both the software side (S/W) to the hardware side (H/W) understand which of the network buffers may be sent out, transferred/received, and/or free by exchanging pointers from the software side to the hardware side and using the pointers to the queues and pools. Thus, for example, the hardware may execute a decision, perform an operation, and retrieve date from the application and push back the results to the applications with transparity.

Figure 7:
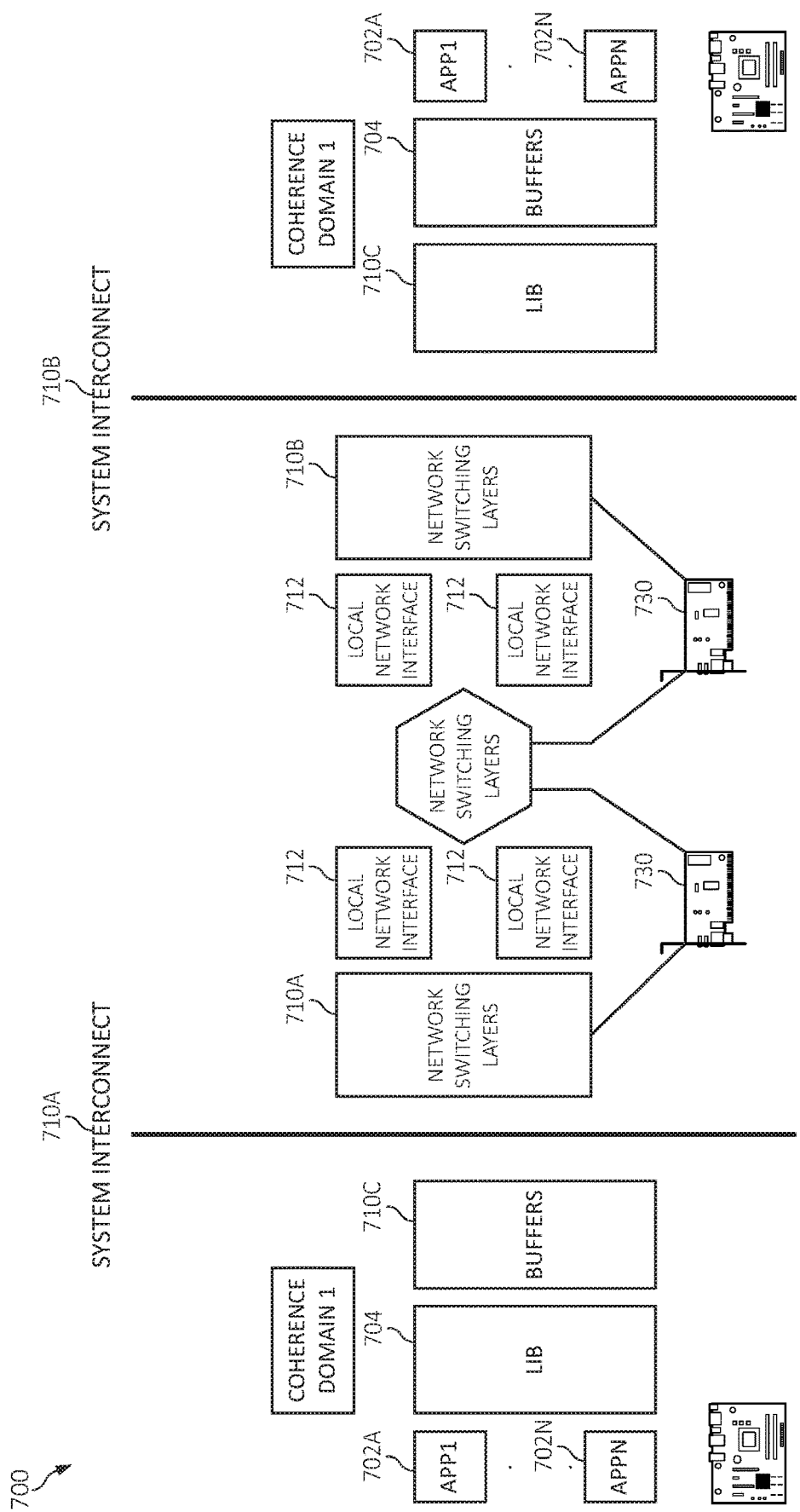
FIG. 7 is a block diagram depicting an operation mode for utilizing coherently attached interfaces in a network stack framework in a computing environment in which aspects of the present invention may be realized.

FIG. 7 is a block diagram depicting an exemplary end-to-end driverless connection system 700 for utilizing coherently attached interfaces in a network stack framework in a computing environment. As will be seen, many of the functional blocks may also be considered "modules" or "components" of functionality, in the same descriptive sense as has been previously described in FIGS. 1-6A-6B. Also, one or more of the operations and steps of FIGS. 1-6A-6B may also be included in one or more operations or actions of FIG. 7. Repetitive description of like elements, components, modules, services, applications, and/or functions employed in other embodiments described herein is omitted for sake of brevity.

As depicted, the system 700 for utilizing coherently attached interfaces in a network stack framework may include one or more system interconnect 710A and 710B. The system interconnect 710A (having coherence domain 1) and 710B (having coherence domain 2) connects one or more application buffers 710C to network buffer hardware 710A and 710B (e.g., the hardware side), which may be enabled via network interface hardware 730 that is also connected to the network switching layers 712. Also, local interface 712 may also be used to connect each network buffer hardware 710A and 710B to the network switching layers 712 (e.g., local network interface). In short, the network interface hardware 730 enables the applications 702A-N (e.g., App1, . . . , AppN and is the software side), the library 704 and the buffers 710 to be directed connected end-to-end via the network interface hardware 730. Thus, the system 700 enables coherent attachment of network interface hardware 730 via the system interconnects 710A-710B bypassing drivers and OS entirely. The application buffers get directly copied to the network interface hardware output buffers without any intervention from the Operating System.

Figure 8:
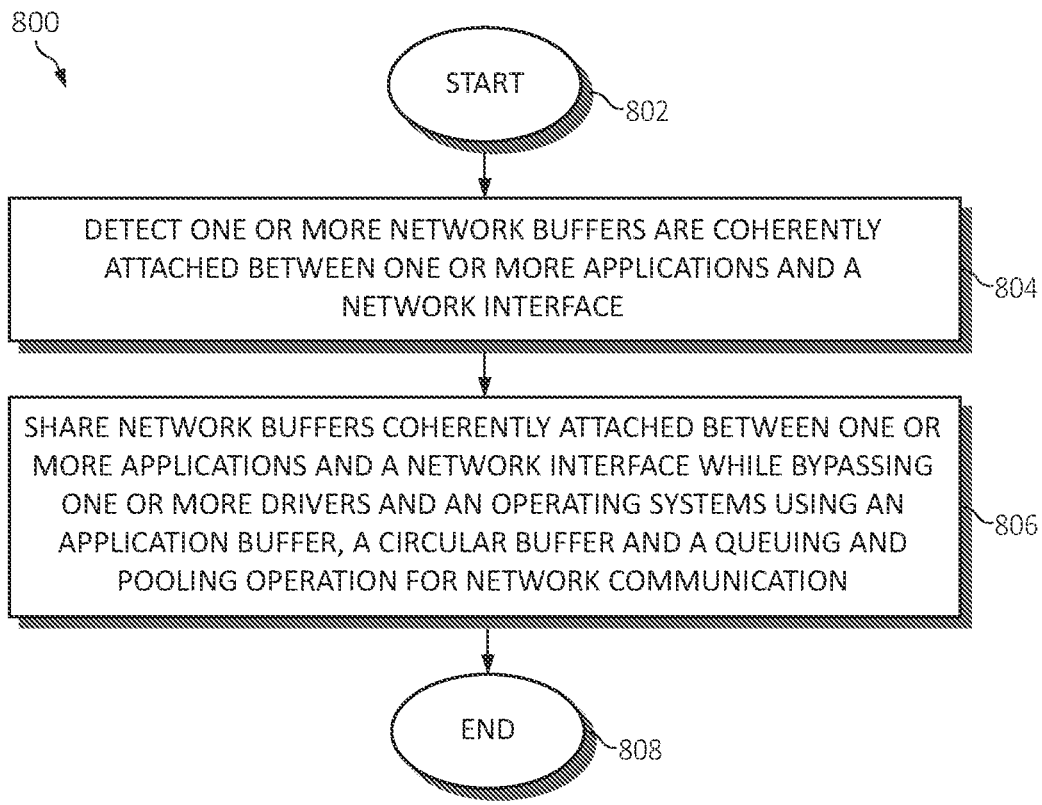
FIG. 8 is a flowchart diagram depicting an additional exemplary method for utilizing coherently attached interfaces in a network stack framework in a computing environment in which aspects of the present invention may be realized.

FIG. 8 is a flowchart diagram depicting an exemplary method 800 for utilizing coherently attached interfaces in a network stack framework in a computing environment, in which various aspects of the illustrated embodiments may be implemented. The functionality 800 may be implemented as a method executed as instructions on a machine, where the instructions are included on at least one computer readable storage medium or one non-transitory machine-readable storage medium. The functionality 800 may start in block 802.

One or more network buffers that are coherently attached between one or more application and a network interface, as in block 804. Network buffers coherently attached between one or more applications and a network interface may be shared while bypassing one or more drivers and an operating systems using an application buffer, a circular buffer and a queuing and pooling operation for network communication, as in block 806. The functionality 800 may end in block 808.

In one aspect, in conjunction with and/or as part of at least one block of FIG. 8, the operations of method 800 may include one or more of each of the following. The operations of method 800 may control the plurality of network buffers by a shared library.

The operations of method 800 may share one or more address spaces of the plurality of network buffers between the one or more applications using the network interface. The plurality of network buffers may be used for input/output (I/O) control. A circular buffer may exchange memory pointers with coherently attached devices.

The operations of method 800 may execute the queuing and pooling operation for the plurality of network buffers for network buffer transmission, reception, and manipulation. The operations of method 800 may move, assign, or reassign one of the plurality of network buffers from one or more queues and one or more pools for executing the queuing and pooling operation. The operations of method 800 may establish a shared memory region and a private memory region using the plurality of network buffers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for utilizing an enhanced network stack framework in a computing environment, comprising:
sharing, in the enhanced network stack framework, a plurality of network buffers coherently attached between one or more applications and a physical network interface of a non-virtualized computing system while bypassing one or more drivers and an operating system of the non-virtualized computing system, wherein the sharing of the plurality of network buffers is executed by a network stack sharing service inclusive of an application buffer, a circular buffer and a queueing and pooling operation, wherein the plurality of network buffers coherently attached between the one or more applications provide a shared library providing a shared region and a private region to the one or more applications, and wherein the one or more applications exchange in-memory data over the physical network interface using a simplified remote direct memory access (RDMA)-style network communications exclusively implementing pointers and spinlocks to reduce RDMA round trip latency.

2. The method of claim 1, further including controlling the plurality of network buffers by a shared library.

3. The method of claim 1, further including sharing one or more address spaces of the plurality of network buffers between the one or more applications using the network interface, wherein the plurality of network buffers used for input/output (I/O) control.

4. The method of claim 1, further including exchanging memory pointers with coherently attached devices using the circular buffer.

5. The method of claim 1, further including executing the queuing and pooling operation for the plurality of network buffers for network buffer transmission, reception, and manipulation.

6. The method of claim 1, wherein the queuing and pooling operation further includes moving, assigning, or reassigning one of the plurality of network buffers from one or more queues and one or more pools.

7. A system for utilizing an enhanced network stack framework, comprising:
one or more computers with executable instructions that when executed cause the system to:
share, in the enhanced network stack framework, a plurality of network buffers coherently attached between one or more applications and a physical network interface of a non-virtualized computing system while bypassing one or more drivers and an operating system of the non-virtualized computing system, wherein the sharing of the plurality of network buffers is executed by a network stack sharing service inclusive of an application buffer, a circular buffer and a queueing and pooling operation, wherein the plurality of network buffers coherently attached between the one or more applications provide a shared library providing a shared region and a private region to the one or more applications, and wherein the one or more applications exchange in-memory data over the physical network interface using a simplified remote direct memory access (RDMA)-style network communications exclusively implementing pointers and spinlocks to reduce RDMA round trip latency.

8. The system of claim 7, wherein the executable instructions when executed cause the system to control the plurality of network buffers by a shared library.

9. The system of claim 7, wherein the executable instructions when executed cause the system to share one or more address spaces of the plurality of network buffers between the one or more applications using the network interface, wherein the plurality of network buffers used for input/output (I/O) control.

10. The system of claim 7, wherein the executable instructions when executed cause the system to exchange memory pointers with coherently attached devices using the circular buffer.

11. The system of claim 7, wherein the executable instructions when executed cause the system to execute the queuing and pooling operation for the plurality of network buffers for network buffer transmission, reception, and manipulation.

12. The system of claim 7, wherein the executable instructions when executed cause the system to move, assign, or reassign one of the plurality of network buffers from one or more queues and one or more pools for executing the queuing and pooling operation.

13. A computer program product for utilizing an enhanced network stack framework by a processor, the computer program product comprising a non-transitory computer-readable storage medium having program instructions embodied thereon, the program instructions executable by a processor to cause the processor to:

share, in the enhanced network stack framework, a plurality of network buffers coherently attached between one or more applications and a physical network interface of a non-virtualized computing system while bypassing one or more drivers and an operating system of the non-virtualized computing system, wherein the sharing of the plurality of network buffers is executed by a network stack sharing service inclusive of an application buffer, a circular buffer and a queueing and pooling operation, wherein the plurality of network buffers coherently attached between the one or more applications provide a shared library providing a shared region and a private region to the one or more applications, and wherein the one or more applications exchange in-memory data over the physical network interface using a simplified remote direct memory access (RDMA)-style network communications exclusively implementing pointers and spinlocks to reduce RDMA round trip latency.

14. The computer program product of claim 13, wherein the program instructions executable by the processor further cause the processor to control the plurality of network buffers by a shared library.

15. The computer program product of claim 13, wherein the program instructions executable by the processor further cause the processor to share one or more address spaces of the plurality of network buffers between the one or more applications using the network interface, wherein the plurality of network buffers used for input/output (I/O) control.

16. The computer program product of claim 13, wherein the program instructions executable by the processor further cause the processor to:

exchange memory pointers with coherently attached devices using the circular buffer; and execute the queuing and pooling operation for the plurality of network buffers for network buffer transmission, reception, and manipulation.

17. The computer program product of claim 13, wherein the program instructions executable by the processor further cause the processor to move, assign, or reassign one of the plurality of network buffers from one or more queues and one or more pools for executing the queuing and pooling operation.

\* \* \* \* \*